(12) United States Patent
Horvath et al.

(10) Patent No.: US 11,967,234 B2
(45) Date of Patent: Apr. 23, 2024

(54) METHOD FOR FILLING UP A PARKING STRUCTURE WITH VEHICLES

(71) Applicant: AUDI AG, Ingolstadt (DE)

(72) Inventors: Jürgen Horvath, Pfakofen (DE); Franz Lankes, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/668,202

(22) Filed: Feb. 9, 2022

(65) Prior Publication Data

US 2022/0270483 A1   Aug. 25, 2022

(30) Foreign Application Priority Data

Feb. 10, 2021 (DE) .......................... 102021103047.1

(51) Int. Cl.
*G08G 1/14* (2006.01)
*G06Q 10/0631* (2023.01)

(52) U.S. Cl.
CPC ......... *G08G 1/146* (2013.01); *G06Q 10/0631* (2013.01); *G08G 1/143* (2013.01); *G06Q 2240/00* (2013.01)

(58) Field of Classification Search
CPC ..... G06Q 2240/00; G06Q 10/02; G06Q 50/30
(Continued)

(56) References Cited

U.S. PATENT DOCUMENTS 10,482,421 B1 * 11/2019 Ducrou .................. G06V 20/54
2001/0013827 A1   8/2001 Kawano
2021/0363715 A1 * 11/2021 Becker .................... E01F 13/12

FOREIGN PATENT DOCUMENTS

CN   109183670 A * 1/2019 .............. E01F 13/06
CN   111047907 A   4/2020
(Continued)

OTHER PUBLICATIONS

"Design Live Loads for Passenger Cars Parking Garages," by Y. K. Wen, and G. L. Yeo, Journal of Structural Engineering, Mar. 2001 (Year: 2001).*

(Continued)

*Primary Examiner* — Omar Zeroual
*Assistant Examiner* — Brian Adams Heflin
(74) *Attorney, Agent, or Firm* — Seed IP Law Group LLP

(57) ABSTRACT

A method for filling up a parking structure with vehicles, which comprises at least one parking level, wherein vehicles can be parked on the at least one parking level, which are allowed to have a combined weight with a maximum value, which is specified for the at least one parking level, includes: when entrance to the parking structure is requested for a new vehicle at a time when it is still located outside of the parking structure the combined weight is determined as the sum of the weight of this new vehicle and the respective weights of other vehicles for which entrance is granted to the at least one parking level at that time, and in the event that the combined weight of the vehicles for a parking level of the at least one parking level is at most as large as the maximal value specified for this, entrance to this one parking level is granted for the new vehicle, and in the event that the combined weight of the vehicles for each parking level of the at least one parking level is greater than the maximum value of a particular parking level, entrance to the parking structure is refused to the new vehicle.

11 Claims, 1 Drawing Sheet

(58) Field of Classification Search
USPC .................................................. 705/5, 6, 13
See application file for complete search history.

(56) References Cited

FOREIGN PATENT DOCUMENTS

| | | | | |
|---|---|---|---|---|
| CN | 111540228 | A | | 8/2020 |
| DE | 102020114292 | A1 | * | 12/2021 |
| EP | 2 858 039 | A1 | | 4/2015 |
| JP | 2004-316198 | A | | 11/2004 |
| JP | 2014055474 | A | * | 3/2014 |
| JP | 2020041288 | A | * | 3/2020 |
| JP | 2021139239 | A | * | 9/2021 |
| KR | 10-2005-0013784 | A | | 2/2005 |
| KR | 10-0493561 | B1 | | 6/2005 |
| KR | 101816566 | B1 | * | 11/2016 |

OTHER PUBLICATIONS

Schmidt, H. et al., "Adaptation of car park loads according to DIN 1055-3 to the current trend of increasing vehicle weights", https://trid.trb.org/view/1093885, 2010. (3 pages).

* cited by examiner

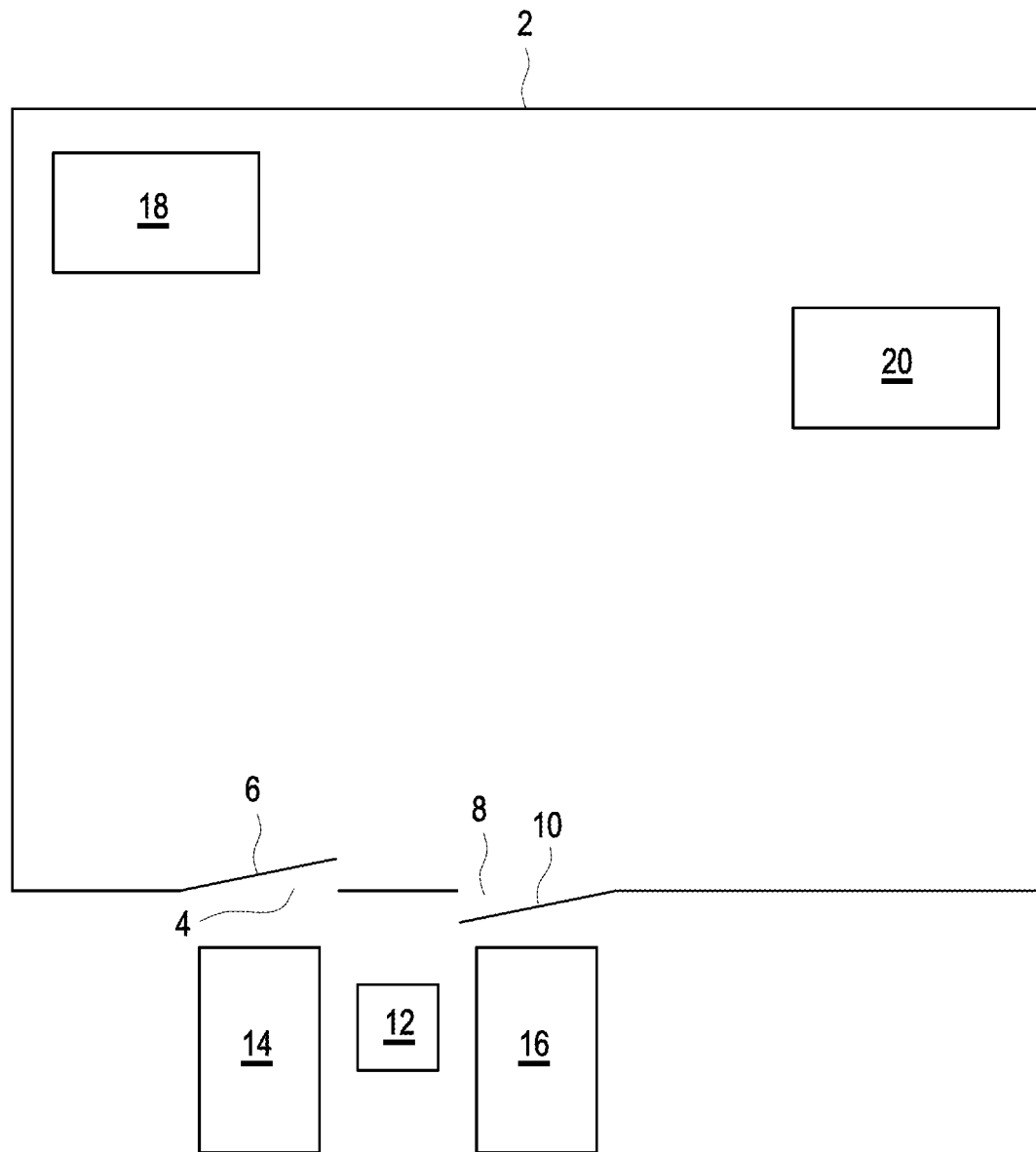

METHOD FOR FILLING UP A PARKING STRUCTURE WITH VEHICLES

BACKGROUND

Technical Field

Embodiments of the invention relate to a method for filling up a parking structure with vehicles and a park management system.

Description of the Related Art

A method for parking space management is known from document CN 111047907 A.

Document CN 111540228 A describes a method for a parking place statistics.

A park management system is described in document KR 20050013784 A.

Given this background, one problem to be solved is the efficient filling up of parking places in a parking structure.

BRIEF SUMMARY

Some embodiments include filling up a parking structure with vehicles, usually with motor vehicles, wherein the parking structure has at least one parking level situated in and/or on at least one floor or at least one story of the parking structure. Vehicles can be parked or are intended to be parked on the at least one parking level, and these vehicles are allowed to have a combined maximum weight, corresponding at most to a maximum value which is specified for the at least one parking level. It is provided that entrance to the parking structure is requested for a new vehicle, which is still located at that time outside of the parking structure, usually by its driver, or in electronic manner, at that time. The combined weight is automatically determined and/or ascertained as the sum of the weight of this new vehicle and respective weights of other vehicles for which entrance is currently being and/or has already been granted at that time to the at least one parking level. In the event that the combined weight of all said vehicles for a parking level of the at least one parking level is at most as large as the maximum value specified for this, entrance to this one parking level is granted for the new vehicle. Furthermore, in the event that the combined weight of all said vehicles for each parking level of the at least one parking level is larger than the maximum value of a respective parking level, entrance to the parking structure is refused for the new vehicle.

In one embodiment of the method, the other vehicles for which entrance is being and/or has already been granted at that time for the at least one parking level are those vehicles which are being and/or have already been parked at that time on the at least one parking level, and furthermore those vehicles which are currently and/or already on their way or moving toward the at least one parking level within the parking structure at that time. Accordingly, these other vehicles are those vehicles which are currently in the parking structure at that time and which are being or have been allocated to the parking level at that time.

The method can be or is to be carried out for a parking structure, usually comprising multiple parking levels arranged one on top of another, wherein each parking level on account of the building quality of the parking structure has a maximum permissible carrying capacity, corresponding to the maximum value of the combined weight. In the method, it is possible to take into account the filling up of all parking levels in terms of the weight of the vehicles for which entrance to a particular parking level is or has been granted. The current combined weights of the vehicles of all parking levels can be compared with each other, and the new vehicles are distributed on the parking level in comparative consideration of the combined weights.

In one embodiment, at least one radio-supported detection device is used at one entrance and one exit of the parking structure. The at least one radio-supported detection device is adapted to communicate by a radio-supported, wireless connection with each new vehicle requesting entrance to the parking structure, but also with each vehicle leaving the parking structure, it being further provided that each vehicle has a communication module, which is designed to communicate with the at least one detection device, and data or information is exchanged between the detection device and the communication module of the vehicle. This can automatically interrogate the weight of each new vehicle and that of each vehicle leaving the parking structure.

Furthermore, each vehicle, usually each new vehicle, prior to driving into or entering the parking structure, will report to a park management system and/or a control device for the parking structure and be registered with the help of its vehicle identification number, usually its VIN number. Moreover, each vehicle will sign off again upon leaving or driving away from the parking structure. It is possible to match up the respective weight with each vehicle and its vehicle identification number. Moreover, it is possible to consult a current list of all vehicles for a parking level and their combined weight and, depending on this, to update and thus dynamically maintain the list when each new vehicle is granted entrance to the parking level and when an already parked vehicle again leaves the parking structure.

It is possible to take account of the weight of vehicles, usually that of each vehicles that has been parked prior to that time on the at least one parking level, also taking account of the weight of each vehicle having already left the parking structure at that time. The combined weight of all the vehicles can be taken into account and updated in ongoing or dynamic manner.

In a further embodiment of the method, a parking place is furthermore selected for and allocated to the new vehicle to which entrance to the at least one parking level is being or has been granted on that parking level, said selected parking place being imparted or communicated to the vehicle or its driver. The selection and allocation of the parking place for the new vehicle takes into account the distribution of the other vehicles for which entrance to the at least one parking level is currently and/or already has been granted at that time. It is provided that all vehicles are homogeneously distributed on the parking level in consideration of the respective weight of each one of the vehicles.

In some embodiments, the weight is automatically interrogated for each new vehicle requesting entrance to the parking structure, usually from its driver. It is possible for the value of the weight to be entered by the driver in an input module in front of the driveway or an entrance of the parking structure. However, it is also possible for the weight of the respective vehicle or the new vehicle to be determined by sensor. In this case, a scale can be installed in a section of the street in front of the driveway or entrance of the parking structure, with which it is possible to automatically weigh the vehicle located on it. It is also possible to detect by sensor the make and model of the respective or new vehicle with a camera and to automatically determine its weight by consulting a database in which the weight is matched up with the make and model of a vehicle. The method can be carried out for all motor vehicles which are operated by an internal combustion engine and/or an electric engine, the method being intended also for electric vehicles and hybrid vehicles. A vehicle which is partly or entirely driven electrically will have a traction battery for the storing of electric energy.

A park management system may be designed for filling up a parking structure with vehicles, usually with motor vehicles, wherein the parking structure comprises at least one parking level, on which vehicles can be or will be parked. The vehicles which can be parked on the at least one parking level are allowed to have in any case a combined weight with a maximum value, which is specified for the at least one parking level. The park management system is adapted, when entrance to the parking structure is requested usually electronically for a new vehicle at a time when it is still located outside of the parking structure, to determine and/or ascertain automatically the combined weight as the sum of the weight of this new vehicle and respective weights of other vehicles for which entrance is being and/or has already been granted to the at least one parking level at that time. The park management system is also adapted, in the event that the combined weight of all said vehicles for a parking level of the at least one parking level is at most as large as the maximum value specified for this, to grant entrance to this one parking level for the new vehicle, and in the event that the combined weight of all said vehicles for each parking level of the at least one parking level is larger than the maximum value of a respective parking level, to refuse entrance to the parking structure for the new vehicle.

One embodiment of the proposed park management systems is designed to carry out one embodiment of the proposed method.

For the reporting in and signing off of a particular vehicle it is possible to use a wireless and/or radio-supported connection, such as an Internet connection or near field communication (NFC), such a wireless connection or communication being likewise designed as a component of the park management system.

In one embodiment, the park management system comprises at least one radio-supported detection device, which can be associated with at least one control device of the park management system. Furthermore, this at least one radio-supported detection device can also be associated with the entrance and the exit of the parking structure. The at least one radio-supported detection device is adapted to communicate, by the mentioned wireless connection, with each new vehicle requesting entrance to the parking structure, but also with each vehicle leaving the parking structure, it being further provided that each vehicle comprises a communication module which communicates with the at least one detection device of the park management system and exchanges information or data. This detection device of the park management system can automatically interrogate the weight of each new vehicle and each vehicle leaving the parking structure. Furthermore, it is possible for the communication module of the vehicle in one embodiment to be connected to a usually central controller of the vehicle, this controller, such as a computer unit of the vehicle, communicating via the communication module with the detection device of the park management system.

If the parking structure comprises multiple parking levels, to which entrance has already been granted for vehicles, at the time when entrance to the parking structure is requested for the new vehicle it is possible to automatically determine and/or ascertain a respective combined weight for all parking levels, during which at first the weight of this new vehicle is considered for all parking levels in such a determination. It is possible for the park management system to grant entrance to the new vehicle for that parking level among all the parking levels for which the combined weight of vehicles has the lowest value, and the new vehicle will be assigned to this parking level. The parking level assigned to the new vehicle and also the parking place located there may be imparted and/or communicated to it by the park management system. It is also possible for the new vehicle to be navigated by the park management system to the parking level assigned to it and to a parking place located there and assigned to the vehicle. This is generally done through the wireless connection or communication, making use of the communication module provided in the new vehicle.

The park management system comprises the at least one control device as a component, being adapted to automatically electronically interrogate the weight for each new vehicle, usually through its driver, for which entrance to the parking structure is requested at the given time, and to automatically determine the combined weight for vehicles of the at least one parking level. The park management system, as already pointed out above, can also comprise in one embodiment a sensor, such as a scale and/or a camera, for the automatic determining and/or ascertaining of the weight of each new vehicle.

The park management system is furthermore intended for a parking structure encompassing the entrance and/or a driveway for vehicles to enter the parking structure, wherein a barrier is arranged at the entrance, which can be opened and closed. This barrier in one embodiment can only be opened by the park management system if entrance is granted to the parking level for the new vehicle still located outside the parking structure at a given time. After this, the barrier is closed once again. Furthermore, the barrier is also closed prior to the time when entrance to the parking structure is requested for the new vehicle and for as long as the combined weight of the vehicles is being determined for the at least one parking level.

Usually the parking structure also comprises an entrance and/or an exit, at which a barrier is likewise arranged, which can be opened and closed, this barrier being opened when a vehicle is leaving the parking structure once again or wishes to do so. At least one control device may also be arranged at the exit of the parking structure, which registers the vehicles as they leave the parking structure. This at least one control device at the exit usually takes account of which vehicle has left which parking level, taking into account the vehicle identification number of the vehicles leaving the parking structure. When taking these into account, the weight of that vehicle which is leaving the parking structure is subtracted from the respective combined weight of vehicles for a respective parking level. On the whole, a control device may be assigned to each of the entrance and the exit. If the entrance and the exit are situated immediately alongside each other, it is possible for one control device to be arranged between the entrance and the exit, which is used to control vehicles for which entrance has been granted to the at least one level and which are driving into the parking structure and exiting vehicles, in consideration of their weight each time.

The park management system is also adapted to select a parking level for the new vehicle and to impart and/or communicate this to the new vehicle, usually via the radio-supported, wireless connection, it being further possible for the park management system to be adapted to also select and communicate a particular parking place for the new vehicle.

In addition, the park management system is adapted to navigate the new vehicle to the selected parking level and to the selected parking place.

The proposed park management system and/or method is furthermore intended for a parking structure having at least one electric charging station on the at least one parking level for the charging of a battery, usually a traction battery, of a vehicle. If a parking place next to such a charging station is requested for the new vehicle and such a place is free, this new vehicle may be assigned to such a parking place with corresponding electric charging station and navigated there by the park management system.

With the method and the park management system it is possible to perform a carrying capacity estimation for the parking structure.

In one embodiment of the method with one embodiment of the park management system, the combined weight of the vehicles is generally estimated and accordingly ascertained and/or determined for the at least one parking level, it not being necessary to ascertain and/or determine exactly the combined weight, since the weight of each vehicle can generally only be ascertained and/or determined approximately and thus estimated. If the weight of a respective vehicle, usually a new vehicle, is interrogated electronically or asked from its driver, in one embodiment of the method it is assumed that the weight as indicated by the driver does not necessarily correspond to the exact weight, since the driver and/or the controller of the vehicle also usually can never know precisely the exact weight, since the weight is dependent on the current cargo of the vehicle. A maximum permissible carrying capacity is designed for the at least one parking level of the parking structure, corresponding to the maximum value for the combined weight of vehicles on the at least one parking level, and for structural reasons it is not permitted to load the at least one parking level with vehicles whose combined weight is larger than the maximum value specified for this.

With the method, it is possible to prevent an overloading of the carrying capacity of the at least one parking level of the parking structure. Each vehicle as it enters or drives up to or exits and leaves reports its weight to the park management system of the parking structure, for example electronically. It is possible to use the wireless and/or radio-supported connection, such as an Internet connection or a near field communication (NFC) for the reporting in and signing off, such a wireless connection being likewise designed as a component of the park management system.

In the method, the park management system decides whether or not the new vehicle may drive into the parking structure. A control and safety check for the new vehicle is performed by evaluating its vehicle identification number and usually a further testing is done at the barrier at the entrance or driveway into the parking structure. The barrier at the entrance is only opened if the new vehicle is found by the park management system to be allowed to enter, which is the case if its weight in addition to the weights of vehicles for which entrance has already been granted is at most as large as the maximum value designed for this.

In one embodiment, the park management system, usually its at least one control device, comprises a counting unit, which calculates and/or estimates the total load and thus the combined weight of the vehicles for the at least one parking level. A new vehicle will be rejected and its entrance to the parking structure denied if its weight in addition to the weight of the other vehicles for which entrance has already been granted is greater than the maximum value. This prevents the maximum permissible carrying capacity of the at least one parking level from being exceeded. In one embodiment, each new arriving vehicle is assigned by the park management system an exact parking place with a parking place number on a parking level and thus on a story, the weight or load of the vehicles on the parking level being distributed in balanced manner, and this assigned parking place is communicated to the vehicle or its driver. If a vehicle designed as an electric vehicle or hybrid vehicle is being electrically charged in the parking structure and thus supplied with electrical energy, a check can also be done through the charging station or charging unit to which this vehicle is connected to make sure that the vehicle is also at its correct or assigned parking place. The vehicle will only be charged by this charging station if it is at the correct parking place assigned to it. If it is at a different parking place, it will be rejected and cannot be charged by the respective charging unit, since the providing of electrical energy to the vehicle will be prevented.

With the method and the park management system it is possible to prevent a maximum carrying capacity of the at least one parking level from being exceeded.

The method can be carried out for an electric vehicle, among others, having a heavier weight than a comparable vehicle with an internal combustion engine. Thus, the method takes into account the fact that the average weight of the vehicles increases with increasing electrical mobility.

An existing parking structure or its at least one parking level is usually suitable only for a given maximum carrying capacity and thus is not designed for vehicles with additional weight. With the method and the park management system it is possible to check and/or monitor the weight-related load on the parking structure. Thus, it is no longer necessary to demolish and rebuild a parking structure or to retrofit and modernize it for an increased carrying capacity.

Of course, the above mentioned and the following features yet to be explained may be used not only in the particular indicated combination, but also in other combinations or standing alone.

BRIEF DESCRIPTION OF THE DRAWING

Embodiments of the invention are represented schematically in the drawing and shall be described schematically and in detail, making reference to the drawing.

FIG. 1 shows in schematic representation a parking structure and one embodiment of a park management system as described herein to carry out one embodiment of a method as described herein.

DETAILED DESCRIPTION

The parking structure 2 shown schematically in FIG. 1 comprises at least one parking level, on which vehicles 14, 16, 18, 20 can be placed and thus parked. This parking structure 2 has an entrance 4 for incoming vehicles 14 and an exit 8 for outgoing vehicles 16. Two vehicles 18, 20 have already been parked on the at least one parking level. A further vehicle 16, which was previously parked on the at least one parking level, has already left the parking structure 2.

The park management system which is associated with the parking structure 2 shown here comprises a control device 12, which is associated here both with the entrance 4 and also with the exit 8 of the parking structure 2. Furthermore, a barrier 6 is associated with the entrance 4 here and a barrier 10 with the exit 8, both barriers 6, 10 being associated here by definition as components of the parking structure 2 and/or the embodiment of the park management system.

Furthermore, the parking structure 2 comprises not otherwise represented charging stations on the at least one parking level, which are adapted to electrically charge a vehicle 14, 16, 18, 20 designed as an electric vehicle or its battery when the vehicle 14, 16, 18, 20 or its battery is connected to the respective charging station.

In the embodiment of the method with the embodiment of the park management system it is proposed that entrance to the parking structure 2 is requested for a new vehicle 14, which is still located outside of the parking structure 2 at the time, through an electronic radio-supported connection at the time. It is proposed here that the control device 12 comprises a detection device, which is adapted to communicate with a communication device of this new vehicle 14 and automatically interrogate its weight in radio-supported and electronic manner.

In the method, the park management system is used to determine and/or ascertain the combined weight as the total of the weight of the new vehicle 14 and the respective weights of other vehicles 18, 20 for which entrance to the at least one parking level has already been or is currently being requested at the time. If it is determined by the park management system that the combined weight for a parking level of the at least one parking level is at most as large as the maximum value specified for this, the new vehicle 14 is granted entrance to this one parking level. If, instead, the park management system determines that the combined weight of each parking level of the at least one parking level of the parking structure 2 is greater than the maximum value specified for this, the new vehicle 14 will be refused entrance to the parking structure 2.

In one embodiment of the method, it may be considered that different maximum values for the combined weight of the vehicles 14, 18, 20 can be provided for different parking levels.

In one embodiment of the method, the weight of all the vehicles 14, 16, 18, 20 which are assigned to a particular parking level of the parking structure 2 is calculated dynamically in permanent manner. Consideration is given not only to which vehicles 18, 20 have already been placed or parked on the at least one parking level, but also those vehicles which, although already having entered the parking structure 2, are still driving toward the at least one parking level and have yet to be parked there. To determine the weight of the vehicles for the at least one parking level, the vehicles 16 are also considered which have already left the parking structure 2, the weight of one such vehicle 16 being subtracted by the park management system from the combined weight of all the vehicles 14, 16, 18, 20.

German patent application no. 10 2021 103047.1, filed Feb. 10, 2021, to which this application claims priority, is hereby incorporated herein by reference in its entirety.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of filling up a parking structure with vehicles, wherein the parking structure includes at least one parking level, a control device, and a barrier to the at least one parking level, and wherein a first plurality of the vehicles can be parked on the at least one parking level, the method comprising:
   closing, by the control device, the barrier to the at least one parking level;
   obtaining, by the control device, a specified maximum value for a combined weight of the first plurality of the vehicles to be parked on the at least one parking level;
   when entrance to the parking structure is requested for a new vehicle located outside of the parking structure, determining, by the control device, a combined weight of the new vehicle and other vehicles for which entrance has already been granted to the at least one parking level;
   responsive to determining that the combined weight is less than or equal to the specified maximum value, granting, by the control device, entrance to the at least one parking level for the new vehicle by opening the barrier to the at least one parking level; and
   responsive to determining that the combined weight is greater than the specified maximum value, refusing, by the control device, entrance to the at least one parking level for the new vehicle by not opening the barrier to the at least one parking level.

2. The method according to claim 1, wherein the other vehicles include vehicles which are being or have already been parked on the at least one parking level, and vehicles which are currently or are already on their way toward the at least one parking level within the parking structure.

3. The method according to claim 1, wherein each vehicle, prior to driving into the parking structure, is registered by way of a vehicle identification number of each vehicle, and each vehicle is signed off upon leaving the parking structure.

4. The method according to claim 1, wherein a parking place is selected for the new vehicle to which entrance to the at least one parking level has been granted, the parking place being allocated and communicated to the new vehicle, wherein selection and allocation of the parking place for the new vehicle takes into account a distribution of the other vehicles, all vehicles being homogeneously distributed on the parking level in consideration of a respective weight of each one of the vehicles.

5. A park management system for filling up a parking structure with vehicles, wherein the parking structure includes at least one parking level, wherein a first plurality of vehicles can be parked on the at least one parking level, the park management system comprising:
   a barrier to the at least one parking level, wherein the barrier to the at least one parking level, in operation, opens and closes; and
   a control device which, in operation,
     closes the barrier to the at least one parking level;
     obtains a specified maximum value of a combined weight of the first plurality of vehicles,
     when entrance to the parking structure is requested for a new vehicle located outside of the parking structure, determines a combined weight of the new vehicle and other vehicles for which entrance has already been granted to the at least one parking level;
     if the combined weight is less than or equal to a specified maximum value, grants entrance to the at least one parking level for the new vehicle by opening the barrier to the at least one parking level; and
     if the combined weight is larger than the specified maximum value, refuses entrance to the at least one parking level for the new vehicle by not opening the barrier to the at least one parking level.

6. The park management system according to claim 5, wherein the control device, in operation, obtains a weight of the new vehicle after entrance is requested to the parking structure by the new vehicle.

7. The park management system according to claim 5, wherein the control device, in operation, selects a parking level for the new vehicle and communicates the parking level to the new vehicle.

8. The park management system according to claim 5, further comprising at least one radio-supported detection device which, in operation, communicates with the new vehicle, to interrogate a weight of the new vehicle or to provide to the new vehicle a parking place allocated to the new vehicle.

9. The park management system according to claim 5, wherein the parking structure includes electric charging stations which, in operation, charge vehicle batteries.

10. The park management system according to claim 5, wherein the control device, in operation, closes the barrier to the at least one parking level again after opening the barrier to the at least one parking level.

11. The method according to claim 1, further comprising:
closing, by the control device, the barrier to the at least one parking level again after opening the barrier to the at least one parking level.

\* \* \* \* \*